Dec. 22, 1931.  C. A. BALTON  1,837,395
SHOCK ABSORBER
Filed March 20, 1930  2 Sheets-Sheet 1
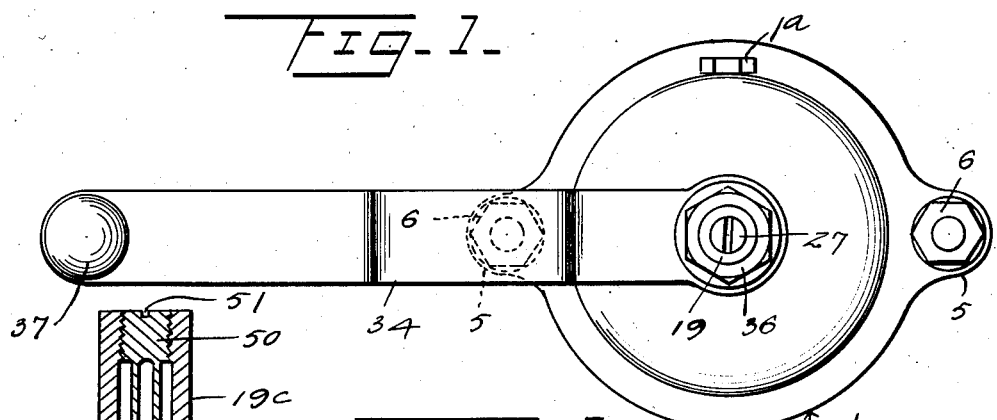
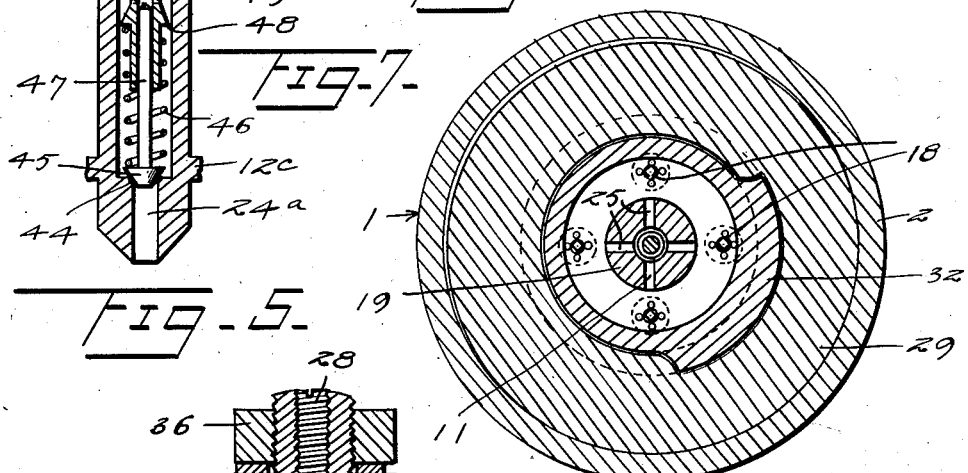
Inventor
C. A. Balton
By Watson E. Coleman
Attorney Dec. 22, 1931.  C. A. BALTON  1,837,395
SHOCK ABSORBER
Filed March 20, 1930   2 Sheets-Sheet 2
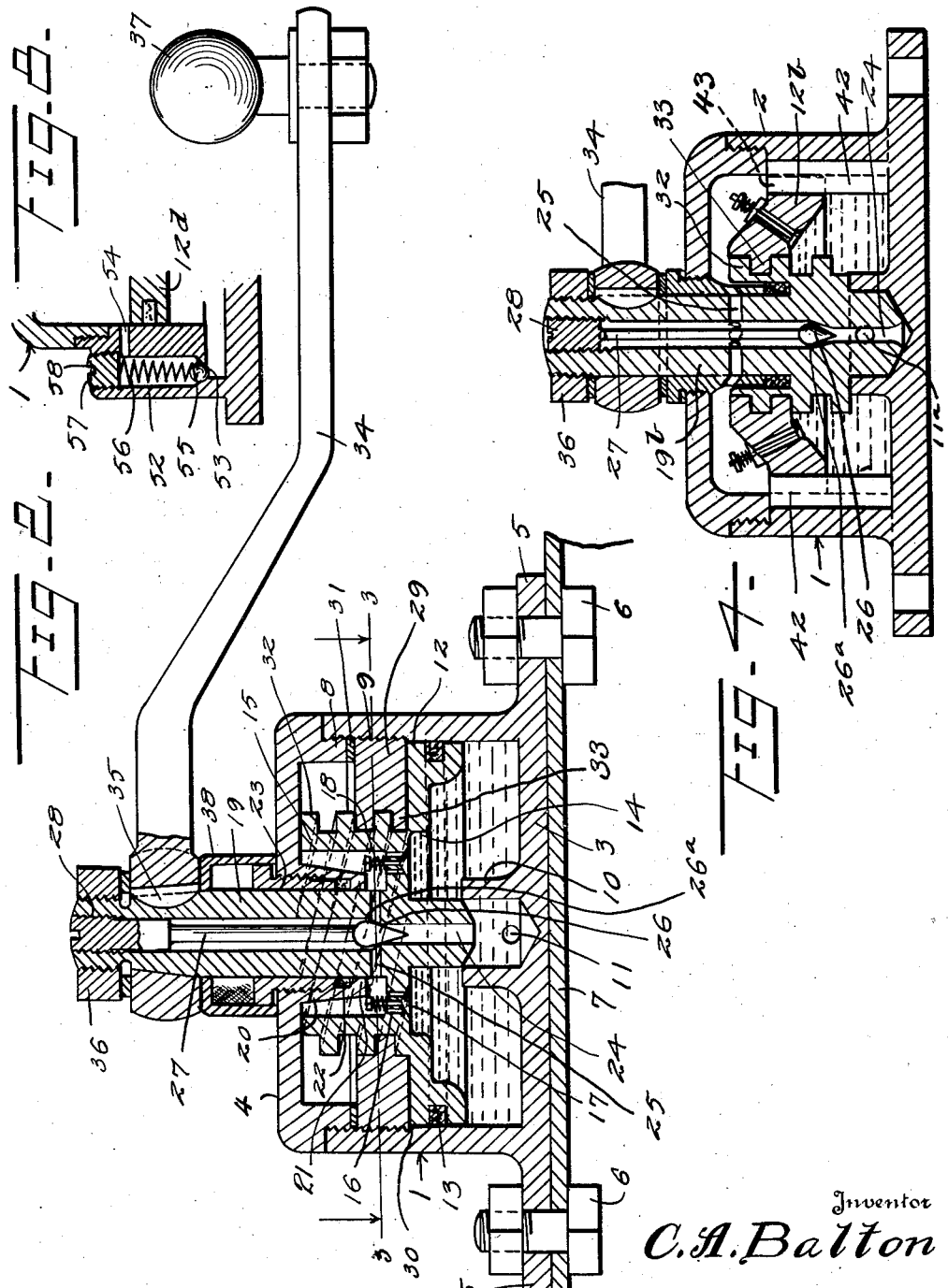
Inventor
C. A. Balton
By Watson E. Coleman
Attorney Patented Dec. 22, 1931

1,837,395

UNITED STATES PATENT OFFICE

CHARLES ANASTASE BALTON, OF BUFFALO, NEW YORK

SHOCK ABSORBER

Application filed March 20, 1930. Serial No. 437,428.

This invention relates to shock absorbers of that type embodying a liquid reservoir adapted to be secured to one of two relatively fixed and movable members, a valved piston within the reservoir, a shaft connected to the piston and provided with a passage and adapted to be secured to the other of said members, and a valve for controlling the effective area of the passage.

The invention has for one of its objects to improve the general construction and increase the efficiency of shock absorbers of the character stated.

To attain the foregoing and other objects, the nature of which will appear as the description proceeds, the invention comprehends the provision of a shock absorber of the character stated wherein the piston shall be reciprocably mounted in the reservoir and helically propelled therein in response to the movements of the member to which it is connected.

The invention further comprehends the provision of a shock absorber of the character stated wherein the helical propelling means shall embody a screw engaged with the piston and fixed against axial movement with respect to the reservoir.

The invention further comprehends the provision of a shock absorber of the character stated wherein either the screw or piston shall be held against turning movement with respect to the reservoir and wherein the part not held against such movement shall be connected to the relatively movable member for actuation thereby.

The invention is hereinafter fully described and claimed, and illustrated in the accompanying drawings, wherein:

Figure 1 is a view in side elevation of a shock absorber embodying my invention;

Figure 2 is a sectional view taken on a horizontal plane extending through the shock absorber;

Figure 3 is a sectional view taken on the vertical plane indicated by the line 3—3 of Figure 2;

Figure 4 is a sectional view taken on a plane extending horizontally and centrally through a modified form of the shock absorber;

Figure 5 is a sectional view taken on a horizontal plane extending centrally through a further modified form of the shock absorber;

Figure 6 is a sectional view taken on the vertical plane indicated by the line 6—6 of Figure 5, and Figures 7 and 8 are sectional views of check valves for the shock absorber.

The shock absorber comprises a reservoir 1 which comprises a cylindrical lateral wall 2, and inner end wall 3 formed integrally with the lateral wall and an outer end wall 4 detachably engaged with the lateral wall. The reservoir 1 is provided at its inner end with lugs 5 to permit it to be secured by bolts 6 to an automobile frame 7 or other suitable member. The outer end wall 4 which is in the form of a cap, bears against the outer end of the lateral wall 2 and is provided with a flange 8 arranged within the lateral wall and screw threadedly engaged therewith. The screw threads 9 of the lateral wall 2 extend inwardly beyond the flange 8 for a purpose to be presently set forth. A socket member 10 which extends outwardly from the center of the inner end wall 3, is fully open at its outer end and provided adjacent its inner end with radial ports 11.

A piston 12 is arranged in the reservoir for inward and outward movements or reciprocation with respect thereto. The piston 12 is provided with a packing ring 13 which bears against the inner surface of the lateral wall 2. The piston 12 is provided in its inner side with a central recess 14 which is equal in depth to the length of the socket member 10 and receives said socket member when the piston is at the limit of its inward movement. A hollow hub 15 extends outwardly from the center of the piston 12 and is fully open at its outer end and has its inner end closed by the piston. Ports 16 which are formed in the piston 12, establish communication between the recess 14 and the interior of the hub 15, and are controlled by inwardly unseating valves 17 which are normally maintained in seated or port closing position by springs 18.

A shaft 19 is formed integrally with the piston 12 and extends inwardly and outwardly beyond the piston, the inner end of the shaft entering the socket member 10 and the outer end thereof passing through the outer end wall 4. This end wall is provided with an inwardly directed collar 20 which surrounds the opening therein and through which the shaft 19 passes. The collar 20 is provided at its inner end with a flange 21 which supports a packing 22 surrounding and contacting with the shaft 19. A gland 23 is screw threadedly engaged in the collar 20 and contacts with the packing 22. The shaft 19 is provided with a longitudinal passage 24 which opens through the inner end thereof, and it is provided with radial openings 25 which establish communication between the passage and the interior of the hub 15.

A needle valve 26 is arranged in the passage 24 and is adjustable with respect to a seat 26ª to vary the effective area of the passage. The valve 26 is carried by a rod 27 which is screw threadedly engaged, as at 28, with the shaft 19 to permit the adjustment of the valve.

A nut 29 is arranged in the reservoir 1 outwardly of the piston 12, and has its periphery engaged with the screw threads 9 of the reservoir 1. The nut 29 is arranged between the flange 8 of the outer end of the wall 4 and a shoulder 30 formed on the inner side of the lateral wall 2, and is held against accidental movement by these parts. A gasket 31 arranged between the flange 8 and the nut 29, establishes a liquid-tight connection between the nut and the lateral wall 2. The hub 15 passes through the nut 29, and is provided at its outer lateral side with screw threads 32 which engage the threads 33 of the nut 29.

An arm 34 is secured at one end to the outer end of the shaft 19 by a key 35, and is held against displacement from the shaft by a nut 36. The arm 34 is provided at its other end with a ball 37 adapted to be engaged with a socket member not shown, for connection with a spring of the automobile. A rubber dust cap 38 is positioned between the outer end wall 4 and that end of the arm 34 secured to the shaft 19, and surrounds the shaft and gland 23.

That portion of the reservoir 1 located outwardly beyond the piston 12 constitutes a suction chamber, and that portion of the reservoir located inwardly beyond the piston constitutes a compression chamber. The liquid, which may be oil or the like, is forced from one of these chambers into the other during the inward and outward movements of the piston 12.

A filler opening located in the top of the reservoir 1 and closed by a plug 1ª, permits the liquid to be introduced into the chamber. The nut 29 and the screw threads 32 on the piston 12 constitute helical propelling means for the piston. This means causes the piston 12 to move outwardly when the latter is turned by and as the result of the collapsing of the spring to which the arm 34 is connected, and causes the piston to move inwardly when it is turned by and as the result of the reaction or return of the spring to normal condition. As the valves 17 unseat during the outward movement of the piston 12, comparatively little resistance is offered to the movement of the piston in this direction. The valves 17 seat during the inward movement of the piston 12, and due thereto, resistance is offered to the movement of the piston in this direction, with the result that the reaction of the spring is so controlled as to cause it to resume its normal position in a manner to prevent the transmission of appreciable shock or jar to the body of the automobile. During the outward movement of the piston 12, the liquid flows from the suction chamber into the compression chamber by way of the port 16, openings 25 and passage 24. During the inward movement of the piston, the liquid flows from the compression chamber into the suction chamber by way of the openings 11, passage 24 and openings 25. As the valve 26 is adjustable with respect to its seat 26ª, the effective area and consequently the resistance offered to the inward movement of the piston 12 may be varied. During the inward movement of the piston, the dust cap 38 will, as it is made from rubber, flex and thus offer comparatively little or no resistance to such movement of the piston.

If desired, the shaft may be formed separately from the piston and secured against endwise movement with respect to the reservoir 1 as shown in Figure 5, wherein the piston is designated 12ª and the shaft 19ª. The shaft 19ª passes through a central opening 38 in the piston 12ª. The inner end of the shaft 19ª contacts with the bottom wall of the socket member 10, and the shaft is provided with an annular flange 39 which contacts with the inner end of the collar 20, to hold the shaft against endwise movement. To establish an operative connection between the shaft 19ª and the piston 12ª, and to permit the piston to move axially with respect thereto, the shaft is provided with longitudinal ribs 40 which work in grooves 41 formed in the wall of the opening 38 in the piston. The shaft is provided at its inner end with openings 11ª which establish communication between the reservoir 1 and the passage of the shaft. The remaining parts of the shock absorber shown in this view are similar to the corresponding parts shown in Figure 2 and are designated by the reference characters.

In addition to forming the shaft and piston separately and holding the former against axial movement, the nut may be omitted, as shown in Figure 4, wherein the piston is designated 12$^b$ and the shaft 19$^b$. The piston 12$^b$ is provided with a central opening through which the shaft 19$^b$ passes, and these parts are provided with screw threads 32 and 33 to provide the helical propelling means for the piston. In order to insure the propulsion thereof, the piston 12$^b$ is held against rotation by ribs 42 formed on and extending longitudinally of the lateral wall 2 of the cylinder 1 and fitting in grooves 43 formed in the periphery of the piston.

The threads of the propelling means may be of the square type, or the screw type or of the round worm type. The shock absorber is adapted for use on pleasure cars, busses, trucks and the like, whether propelled by internal combustion engines, steam engines or electric motors. It is also adapted to be used on airplanes, railroad cars, and as a door check. When used as a door check, the device will be equipped with the spring powered check valve shown in Figure 7 or the one shown in Figure 8. The check valve shown in Figure 7 is adapted for use in connection with the shaft of the shock absorber which part is here designated 19$^c$. The shaft 19$^c$ is provided with a longitudinal passage 24$^a$ which is provided adjacent its inner end with a valve seat 44. The passage 24$^a$ communicates at its inner end with the reservoir and inwardly of the piston 12$^c$ and communicates at its outer end with the reservoir and outwardly of the piston, and to establish said latter communication, the shaft 19$^c$ is provided with radial openings 45. An inwardly seating valve head 45 is yieldingly held against the seat 44 by a spring 46 which is mounted upon the stem 47 of the valve head and between the valve head and a shoulder 48 on a sleeve 49. The sleeve 49 is arranged in the passage 24$^a$ and receives the upper end portion of the valve stem 47. The sleeve is provided at its outer end with a head 50 which is screw threadedly engaged with the wall of the passage and provided with a notch 51 to permit it to be adjusted in the direction of the length of the passage 24 to vary the tension of the spring 46 and consequently, the pressure under which the valve head 45 is held seated.

During the inward movement of the piston 12$^c$, the valve head 45 will unseat under the pressure of the liquid against its inner side, and thus permit the liquid to flow from the inner side to the outer side of the piston. When the piston 12$^c$ moves outwardly, the valve head 45 will be seated by the spring 46 under the pressure of the fluid against its outer side, and the liquid will pass through the spring powered check valves carried by the piston, such valves being similar to those shown in the pistons 12, 12$^a$ and 12$^b$.

The check valve shown in Figure 8 comprises a casing 52 which is carried by the side of the reservoir 1 and is provided at its inner end with a port 53 and at its outer end with a port 54. The port 53 communicates with the reservoir 1 inwardly of the piston 12$^d$, and the port 54 communicates with the reservoir outwardly of the piston. This piston may be similar to either of the pistons 12, 12$^a$ or 12$^b$. The port 53 is under the control of a ball valve 55 which seats inwardly and is normally held seated by a spring 56 arranged between the valve and a plug 57. The plug 57 is screw threadedly engaged in the outer end of the casing 52 and is provided with a notch 58 to permit it to be adjusted in the direction of the length of the casing and thus vary the tension of the spring and consequently the power under which the valve 55 is held seated. The shaft for the piston 12$^d$ may or may not be provided with a valve, and when not provided with a valve, it will be of solid formation. During the inward movement of the piston, the valve 55 unseats under the pressure of the liquid against its under side and permits the liquid to flow from the inner to the outer side of the piston.

When the piston 12$^d$ moves outwardly, the valve 55 seats under the pressure of the spring 56 and the pressure of the liquid acting against its outer side, causing the liquid to flow through the valves with which said piston is provided, such valves being similar to those of the pistons 12 to 12$^c$.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A shock absorber comprising a reservoir, a member contacting with the lateral wall and spaced from the end walls of the reservoir to separate it into a suction chamber and a compression chamber, a hollow member open at one end and closed at the other and passing through and screw-threadedly engaged with said first member, the open end of said second member communicating with the suction chamber and the closed end of said member being provided with a port establishing communication between said member and the compression chamber, a spring powered valve controlling said port, a piston located in the compression chamber in contact with the lateral wall of the reservoir and fixed to said second member, and an operating shaft connected to the piston.

2. A shock absorber comprising a reservoir, a member contacting with the lateral wall and spaced from the end walls of the reservoir to separate it into a suction chamber and a compression chamber, a hollow member open at one end and closed at the other and passing through and screw-threadedly engaged with said first member, the open end of said second member communicating with the suction chamber and the closed end of said member being provided with a port establishing communication between said member and the compression chamber, a spring powered valve controlling said port, a piston located in the compression chamber in contact with the lateral wall of the reservoir and fixed to said second member, an operating shaft connected to and extending axially through said second member, the shaft being provided with an axial passage communicating with the compression chamber and with the interior of said second member, and a valve for controlling the effective area of said passage.

3. A shock absorber comprising a reservoir, a member contacting with the lateral wall and spaced from the end walls of the reservoir to separate it into a suction chamber and a compression chamber, a hollow member open at one end and closed at the other and passing through and screw-threadedly engaged with said first member, the open end of said second member communicating with the suction chamber and the closed end of said member being provided with a port establishing communication between said member and the compression chamber, a spring powered valve controlling said port, a piston located in the compression chamber in contact with the lateral wall of the reservoir and fixed to said second member, an operating shaft connected to and extending axially through said second member, the shaft being provided with an axial passage communicating with the compression chamber and with the interior of said second member, a valve for controlling the effective area of said passage, and a socket member fixed in the compression chamber receiving the shaft and provided with the port communicating with this chamber.

4. A shock absorber comprising a reservoir, a member contacting with the lateral wall and spaced from the end walls of the reservoir to separate it into a suction chamber and a compression chamber, a hollow member open at one end and closed at the other and passing through and screw-threadedly engaged with said first member, the open end of said second member communicating with the suction chamber and the closed end of said member being provided with a port establishing communication between said member and the compression chamber, a spring powered valve controlling said port, a piston located in the compression chamber in contact with the lateral wall of the reservoir and fixed to said second member, an operating shaft passing axially through said second member, one of said last parts being provided with grooves, and ribs carried by the other of said last parts and fitting in said grooves.

5. A shock absorber comprising a reservoir having a lateral and an end wall, the lateral wall being provided with interior screw-threads, a nut having its periphery engaged with said screw-threads, a cap engaged with said screw-threads and contacting with the nut, a piston arranged within the reservoir at one side of the nut, a hollow hub connected to the piston and passing through and engaged with the nut, one end of the hub being open and communicating with the reservoir at the opposite side of the nut and the other end of the hub being closed, said closed end of the hub being provided with a port establishing communication between the hub and said first side of the reservoir, a spring powered valve controlling said port, and an operating shaft connected to the hub.

In testimony whereof I hereunto affix my signature.

CHARLES ANASTASE BALTON.